United States Patent
Miyoshi et al.

(10) Patent No.: US 8,684,877 B2
(45) Date of Patent: Apr. 1, 2014

(54) GEAR TRANSMISSION

(75) Inventors: Hiroyuki Miyoshi, Tsu (JP); Masahiro Takahashi, Tsu (JP)

(73) Assignee: Nabtesco Corporation, Tokyo (JP)

( * ) Notice: Subject to any disclaimer, the term of this patent is extended or adjusted under 35 U.S.C. 154(b) by 116 days.

(21) Appl. No.: 13/143,478

(22) PCT Filed: Dec. 21, 2009

(86) PCT No.: PCT/JP2009/071216
§ 371 (c)(1),
(2), (4) Date: Jul. 6, 2011

(87) PCT Pub. No.: WO2010/079683
PCT Pub. Date: Jul. 15, 2010

(65) Prior Publication Data
US 2011/0275469 A1    Nov. 10, 2011

(30) Foreign Application Priority Data

Jan. 9, 2009  (JP) ................................ 2009-003490

(51) Int. Cl.
*F16H 1/32*    (2006.01)
(52) U.S. Cl.
USPC ........................................................ 475/162
(58) Field of Classification Search
USPC ......................................... 475/162, 163, 168
See application file for complete search history.

(56) References Cited

U.S. PATENT DOCUMENTS

| 6,699,152 B2* | 3/2004 | Tanaka ........................... 475/149 |
| 7,988,581 B2* | 8/2011 | Kobayashi .................... 475/162 |
| 2004/0254042 A1* | 12/2004 | Tsurumi ....................... 475/163 |
| 2007/0232433 A1 | 10/2007 | Haga et al. |
| 2009/0118050 A1 | 5/2009 | Takeuchi |
| 2009/0124446 A1 | 5/2009 | Miyoshi |
| 2010/0004086 A1 | 1/2010 | Miyoshi et al. |
| 2011/0028259 A1 | 2/2011 | Miyoshi et al. |

FOREIGN PATENT DOCUMENTS

| CN | 101046239 | 10/2007 |
| CN | 101429990 | 5/2009 |
| JP | 57-158061 U | 10/1982 |

(Continued)

OTHER PUBLICATIONS

English translation of Written Opinion dated Aug. 16, 2011 from parent PCT application No. PCT/JP2009/071216.

(Continued)

*Primary Examiner* — David D Le
*Assistant Examiner* — Ryan Dodd
(74) *Attorney, Agent, or Firm* — J-Tek Law PLLC; Jeffrey D. Tekanic; Scott T. Wakeman

(57) ABSTRACT

A gear transmission comprises an internal gear, an external gear, a first gear, a crankshaft, a two-stage gear and a second gear. The first gear is affixed to an end of the crankshaft, which eccentrically rotates one of the internal gear and the external gear. The two-stage gear comprises a center gear and an outer-toothed ring gear. The center gear meshes with the first gear. The outer-toothed ring gear surrounds the first gear. The second gear meshes with the outer-toothed ring gear and transmits torque from a motor to the two-stage gear. The two-stage gear is configured such that the center gear and the outer-toothed ring gear are each at least partially disposed in a common plane that crosses the rotational axis of the gear transmission.

20 Claims, 2 Drawing Sheets

(56) References Cited

FOREIGN PATENT DOCUMENTS

| | | |
|---|---|---|
| JP | 1-96551 U | 6/1989 |
| JP | 2005-180493 A | 7/2005 |
| JP | 2008-101726 A | 5/2008 |
| WO | 2007-125835 | 11/2007 |

OTHER PUBLICATIONS

International Search Report dated Jan. 26, 2010 from parent PCT application No. PCT/JP2009/071216.

Office Action from Chinese Patent Office mailed May 31, 2013 for counterpart CN application No. 200980154215.6, including English translation of substantive portion thereof.

* cited by examiner

GEAR TRANSMISSION

CROSS-REFERENCE

This application is the US national stage of International Patent Application No. PCT/JP2009/071216 filed on Dec. 21, 2009, which claims priority to Japanese Patent Application No. 2009-003490, filed on Jan. 9, 2009, the contents of which are hereby incorporated by reference into the present application.

TECHNICAL FIELD

This application generally relates to an eccentric oscillating-type gear transmission.

BACKGROUND ART

A gear transmission is known that has an internal gear and an external gear, one of the gears eccentrically rotating while meshing with the other of the gears. An example of this type of gear transmission is disclosed in, e.g., International Publication No. WO2007/125835. In the description below, International Publication No. WO2007/125835 will be called Patent Document 1. The gear transmission of Patent Document 1 comprises an internal gear, an external gear, a crankshaft and a two-stage gear. The crankshaft extends alongside the axis of the gear transmission. The crankshaft has an eccentric body. The eccentric body engages with the external gear. When the crankshaft rotates, the external gear eccentrically rotates while meshing with the internal gear. The external gear rotates relative to the internal gear in accordance with the difference in the number of teeth of the external gear and the number of teeth of the internal gear. A first gear is affixed to an end of the crankshaft. The first gear meshes with one gear of the two-stage gear. A second gear meshes with the other gear of the two-stage gear. The second gear transmits torque from the motor to the two-stage gear.

SUMMARY OF THE INVENTION

In the gear transmission of Patent Document 1, one of the gears of the two-stage gear is offset from the other gear in the axial direction of the gear transmission. In the description below, the term "axial direction" simply means the axial direction of the gear transmission. The first gear meshes with one of the gears of the two-stage gear, and the second gear meshes with the other of the gears of the two-stage gear. Consequently, the first gear and the second gear are offset in the axial direction. If the amount of offset of the first gear and the second gear is reduced, the length in the axial direction can be reduced. However, there is a limitation to reducing the amount of offset of the first gear and the second gear in case the two-stage gear comprises two spur gears. By employing a two-stage gear that has a novel configuration, the present specification teaches techniques for realizing a gear transmission in which the amount of offset of the first gear and the second gear is reduced, and the length in the axial direction is shortened.

In one aspect of the present teachings, a gear transmission is taught, in which one of an internal gear and an external gear eccentrically rotates while meshing with the other of the internal gear and the external gear. The gear transmission comprises a crankshaft, a first gear, a second gear, and a two-stage gear. The first gear is affixed to an end of the crankshaft. The crankshaft eccentrically rotates one of the internal gear and the external gear. The two-stage gear comprises a center gear and an outer-toothed ring gear. The center gear meshes with the first gear. The outer-toothed ring gear is disposed coaxially with the center gear and surrounds the first gear. The second gear meshes with the outer-toothed ring gear. The second gear transmits torque from a motor to the two-stage gear. The two-stage gear is configured such that the center gear and the outer-toothed ring gear are disposed in one plane that crosses the axis of the gear transmission.

Due to the configuration of the two-stage gear, the amount of offset of the first gear and the second gear in the axial direction can be reduced. Further, the expression "the center gear and the outer-toothed ring gear are disposed in one plane" in the present specification means that at least a portion of the outer-toothed ring gear is disposed within a range, which is defined by a horizontally-extending space where teeth of the center gear are formed. In other words, "the center gear and the outer-toothed ring gear are disposed in one plane" means that, as viewed from a direction perpendicular to the axis of the gear transmission, the center gear overlaps with at least a portion of the outer-toothed ring gear.

In the above gear transmission, the outer-toothed ring gear surrounds the first gear. Consequently, the meshing position of the second gear and the outer-toothed ring gear in the axial direction can be determined independently from the meshing position of the first gear and the center gear. Since the amount of offset of the first gear and the second gear can be reduced, the length of the gear transmission in the axial direction can be shortened.

In one embodiment of the techniques taught in the present specification, the first gear and the second gear may be disposed in one plane that crosses the axis of the gear transmission. As was described above, the meshing position of the second gear and the outer-toothed ring gear can be determined independently from the meshing position of the first gear and the center gear. Consequently, if the first gear and the second gear are disposed in one plane that crosses the axis of the gear transmission, the length of the gear transmission in the axial direction can be further shortened.

In another embodiment of the techniques taught in the present specification, a recess extending in a circumferential direction may be formed between the center gear and the outer-toothed ring gear. In this type of configuration, the first gear can be disposed within the recess.

In another embodiment of the techniques taught in the present specification, a shaft supporting the second gear may extend in a second direction that is opposite to a first direction in which the crankshaft extends from the first gear, and the shaft may be supported in a cantilevered manner. That is, a bearing for rotatably supporting the second gear may be disposed, relative to the second gear, on the side thereof in the second direction. Furthermore, a bevel gear may be coaxially affixed to the second gear on the first direction side of the second gear. In other words, the bevel gear may be affixed to the second gear on the opposite side from the direction in which the shaft supporting the second gear extends.

As was described above, the first gear is affixed to the end of the crankshaft. The main components, such as the external gear, etc., are concentrated in the first direction in which the crankshaft extends from the first gear. Consequently, the bearing for rotatably supporting the second gear would not be easily disposed on the first direction side relative to the second gear. A space for disposing the bearing that rotatably supports the second gear can be easily maintained in the direction opposite of the first direction (the second direction). Further, if the bevel gear is coaxially affixed to the second gear, a configuration can be realized in which the output shaft of the motor extends in a direction different to the axial direction of the shaft supporting the second gear. Consequently, the length in the axial direction of the device comprising the motor and the gear transmission can be shortened. In the above gear transmission, the bevel gear is affixed to the second gear on the first direction side (the side opposite of the direction in which the shaft supporting the second gear extends). Consequently, the bearing for rotatably supporting the second gear can be disposed near the second gear. Since the length of the shaft supporting the second gear can be shortened, the length of the gear transmission in the axial direction can be further shortened.

The techniques taught in the present specification make it possible to provide a gear transmission having a short length in the axial direction.

DESCRIPTION OF THE EMBODIMENTS

Figure 1:
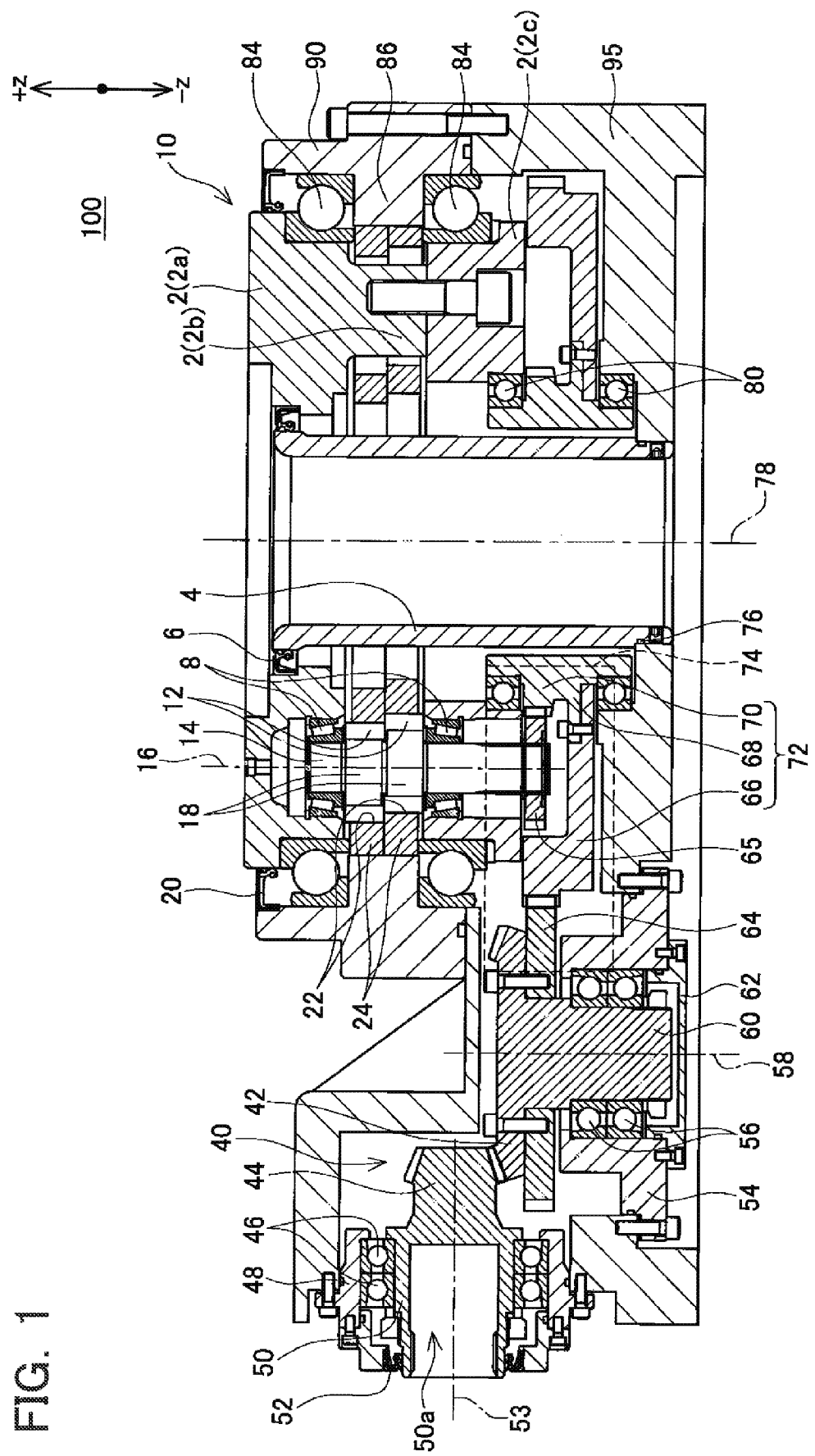
FIG. 1 shows a cross-sectional view of a gear transmission of an exemplary embodiment.
Figure 2:
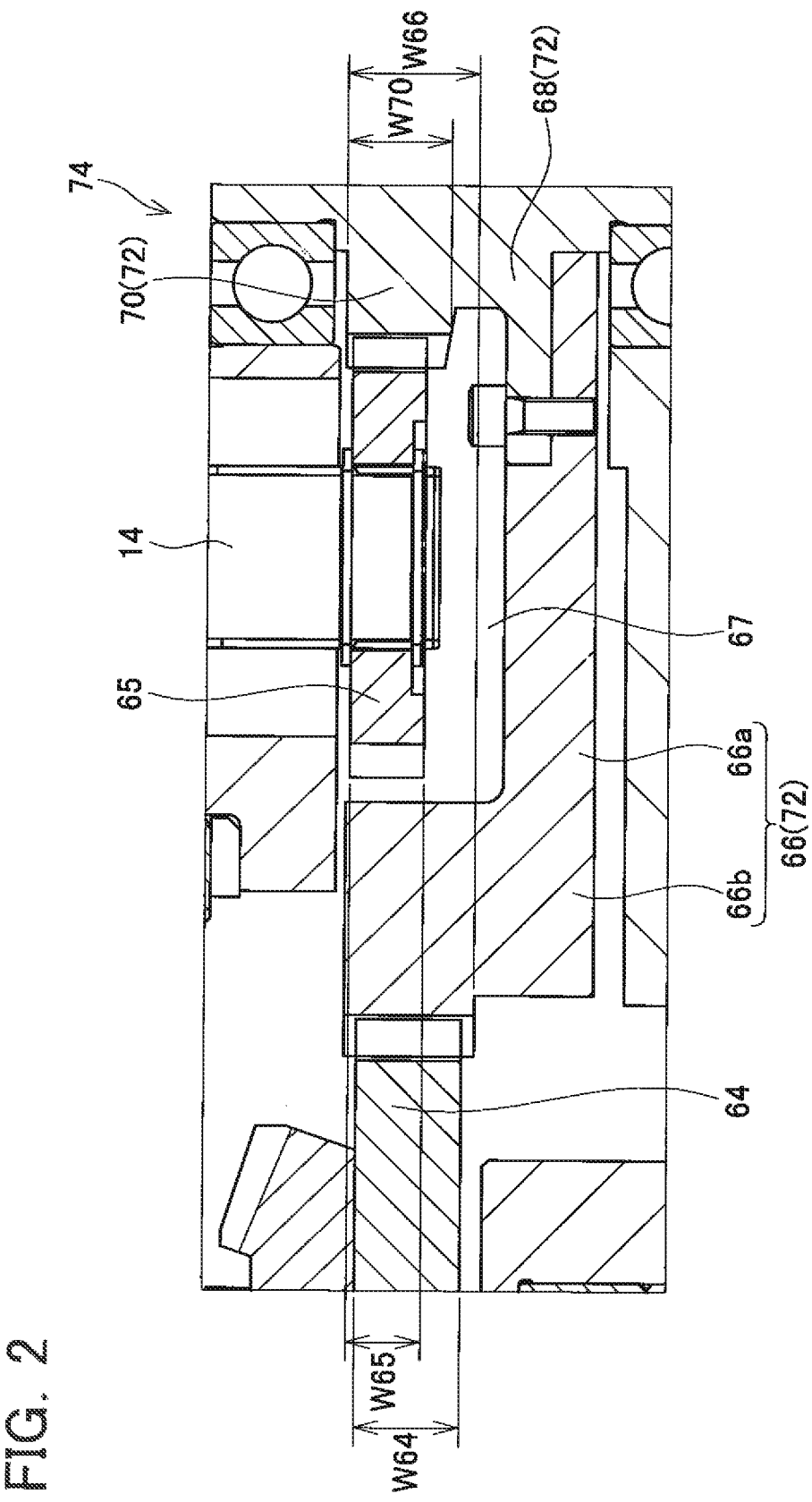
FIG. 2 shows a partial, enlarged view of the area enclosed by the broken line of FIG. 1.

A gear transmission 100 will be described with reference to the Figures. FIG. 1 shows a cross-sectional view of the gear transmission 100. FIG. 2 shows a partial, enlarged view of the area enclosed by broken line 74 of FIG. 1. The gear transmission 100 comprises a reduction unit 10, an axial direction changing unit 40 and a pedestal 95. First, the reduction unit 10 will be described. Further, with the exception of a two-stage gear 72, the basic configuration of the reduction unit 10 is known, and consequently a simple description will be given here.

The reduction unit 10 comprises an internal gear 86, external gears 24, a crankshaft 14, a carrier 2 and the two-stage gear 72. The two-stage gear 72 will be described later. The internal gear 86 is formed on an inner circumference surface of a case 90. The internal gear 86 meshes with the two external gears 24. The carrier 2 comprises a carrier upper portion 2a, a carrier lower portion 2c and a column-shaped portion 2b. The carrier upper portion 2a and the carrier lower portion 2c are fixed together via the column-shaped portion 2b. The carrier 2 is disposed coaxially with the axis 78 of the internal gear 86. In the description below, the axis 78 may also be called the axis of the carrier 2 or the axis of the gear transmission 100. The carrier 2 is rotatably supported on the case 90 (the internal gear 86) by a pair of angular contact ball bearings 84. Further, the case 90 is affixed to the pedestal 95.

The carrier 2 supports the crankshaft 14. The crankshaft 14 is rotatably supported on the carrier 2 by tapered roller bearings 8. The axis 16 of the crankshaft 14 is offset in the radial direction from the axis 78 of the carrier 2. That is, the axis 16 is parallel to the axis 78. The crankshaft 14 extends alongside the axis 78 of the gear transmission 100 at a position offset from the axis 78 of the gear transmission 100. Two eccentric bodies 18 are formed on the crankshaft 14. Each eccentric body 18 fits into a respective through-hole 22 of the external gear 24 via needle roller bearings 12. Consequently, the external gears 24 are supported on the carrier 2 via the crankshaft 14. A first gear 65 is affixed to an end of the crankshaft 14. The first gear 65 meshes with a center gear 70 of the two-stage gear 72 that will be described below. Torque from a motor (not shown) is transmitted to the first gear 65 via the two-stage gear 72.

As was described above, the eccentric bodies 18 of the crankshaft 14 fit into the through-holes 22 of the external gears 24. When the crankshaft 14 rotates, the external gears 24 eccentrically rotate about the axis 78 of the internal gear 86. The number of teeth of the external gears 24 differs from the number of teeth of the internal gear 86. Consequently, when the external gears 24 eccentrically rotate, the external gears 24 rotate relative to the internal gear 86 (the case 90). Since the external gears 24 rotate together with the carrier 2, the carrier 2 rotates relative to the case 90 when the external gears 24 eccentrically rotate.

Next, the axial direction changing unit 40 will be described. Since the basic configuration of the axial direction changing unit 40 is also known, a simple description will be given here. The axial direction changing unit 40 comprises a first bevel gear 44 and a second bevel gear 42. The first bevel gear 44 is supported on a first shaft 50. The first shaft 50 corresponds to a hub of the first bevel gear 44. The first shaft 50 is housed in a first sleeve 48. The first shaft 50 is rotatably supported in the first sleeve 48 by angular contact ball bearings 46. The first sleeve 48 is affixed to the pedestal 95. A hole 50a is formed in the first shaft 50, and an output shaft (not shown) of the motor is fixed within the hole 50a.

The second bevel gear 42 is supported on a second shaft 60. The second shaft 60 corresponds to a hub of the second bevel gear 42. The second shaft 60 is housed in a second sleeve 54. The second shaft 60 is rotatably supported in the second sleeve 54 by angular contact ball bearings 56. The second sleeve 54 is affixed to the pedestal 95. A second gear 64 is affixed to the second shaft 60.

The axis 58 of the second gear 64 and the second bevel gear 42 is parallel to the axis 78 of the gear transmission 100. Further, the axis 58 is perpendicular to the axis 53 of the first bevel gear 44. The rotational torque of the motor is transmitted to the reduction unit 10 via the first bevel gear 44 and the second bevel gear 42. The direction of the rotational torque from the motor is changed by the first bevel gear 44 and the second bevel gear 42. Using the axial direction changing unit 40 allows the motor to be disposed in a direction perpendicular to the axis 78 of the gear transmission 100. Consequently, the length of the device, which includes the motor and the gear transmission 100, can be shortened in the direction of the axis 78. Further, the second shaft 60 supports the second gear 64. Consequently, the second bevel gear 42 can also be described as being affixed to the second gear 64. Further, the second gear 64 meshes with an outer-toothed ring gear 66 of the two-stage gear 72 that will be described below.

The two-stage gear 72 will be described. The two-stage gear 72 comprises the center gear 70 and the outer-toothed ring gear 66. The outer-toothed ring gear 66 is coaxially affixed to the center gear 70. More precisely, the outer-toothed ring gear 66 is affixed to a hub 68 of the center gear 70. The center gear 70 is rotatably supported on the carrier 2 and the pedestal 95 by a pair of deep groove ball bearings 80. The axis of the two-stage gear 72 is identical to the axis 78 of the gear transmission 100. The torque from the second gear 64 is transmitted to the first gear 65 by the two-stage gear 72. That is, torque from the motor is transmitted from the axial direction changing unit 40 to the reduction unit 10 by the two-stage gear 72.

As shown in FIG. 2, a recess 67 is formed in a central portion of the outer-toothed ring gear 66. The recess 67 is formed in a ring shape about the center gear 70. In other words, the thickness of an outer portion 66b of the outer-toothed ring gear 66 in the direction of the axis 78 is greater than the thickness of an inner portion 66a of the outer-toothed ring gear 66 in the direction of the axis 78. The first gear 65 is disposed in the recess 67 of the outer-toothed ring gear 66 and is surrounded by the outer-toothed ring gear 66. Since the first gear 65 is surrounded by the outer-toothed ring gear 66, the meshing position of the first gear 65 and the center gear 70 in the direction of the axis 78 can be determined independently from the meshing position of the second gear 64 and the outer-toothed ring gear 66. Consequently, the first gear 65 and the second gear 64 can be disposed in one plane.

The range W70 of FIG. 2 indicates the horizontally-extending spatial range where the outer teeth of the center gear 70 are formed. Further, the range W66 indicates the horizontally-extending spatial range where the outer teeth of the outer-toothed ring gear 66 are formed. As is clear from FIG. 2, the range W70 and the range W66 overlap. The center gear 70 and the outer-toothed ring gear 66 are disposed in one plane that crosses the axis 78 of the gear transmission 100. More accurately, the center gear 70 and the outer-toothed ring gear 66 are disposed in one plane perpendicular to the axis 78 of the gear transmission 100. In other words, as viewed from a direction perpendicular to the axis 78 of the gear transmission 100 (see FIG. 1), the center gear 70 overlaps with a portion (the outer portion 66b) of the outer-toothed ring gear 66. In the two-stage gear 72, the amount of offset of the first gear 65 and the second gear 64 in the axial direction can be made smaller than in a conventional two-stage gear comprising two spur gears. Consequently, the length of the gear transmission 100 in the direction of the axis 78 can be made shorter than that of a conventional gear transmission.

Further, in the gear transmission 100 of the present embodiment, the horizontally-extending spatial range W65, where the outer teeth of the first gear 65 are formed, overlaps with a portion of the horizontally-extending spatial range W64, where the outer teeth of the second gear 64 are formed. In other words, the first gear 65 and the second gear 64 are disposed in one plane perpendicular to the axis 78 of the gear transmission 100. The first gear 65 and the second gear 64 can be disposed in one plane perpendicular to the axis 78 due to the center gear 70 and the outer-toothed ring gear 66 being disposed in one plane perpendicular to the axis 78 in a state where the outer-toothed ring gear 66 surrounds the first gear 65; that is, it is because the meshing position of the first gear 65 and the center gear 70 in the direction of the axis 78 of the gear transmission 100 can be determined independently from the meshing position of the second gear 64 and the outer-toothed ring gear 66. If the first gear 65 and the second gear 64 are disposed in one plane perpendicular to the axis 78, the length of the gear transmission 100 in the direction of the axis 78 can be further shortened.

Other features of the gear transmission 100 will be described. Symbol "+Z" of FIG. 1 indicates the direction facing upward in FIG. 1; symbol "−Z" indicates the direction facing downward in FIG. 1. The +Z direction may be called the first direction, and the −Z direction may be called the second direction. The second shaft 60 supporting the second gear 64 extends from the second gear 64 in the −Z direction. The crankshaft 14 extends from the first gear 65 in the +Z direction. That is, the second shaft 60 extends, relative to the second gear 64, in the opposite direction from the +Z direction in which the crankshaft 14 extends from the first gear 65. The components that comprise the reduction unit 10 are concentrated farther towards the +Z direction side than the first gear 65. If the second shaft 60 were to extend from the second gear 64 in the +Z direction, it would be difficult to maintain a space for disposing the angular contact ball bearing 56 and the second sleeve 54. If the second shaft 60 extends from the second gear 64 in the −Z direction, the second shaft 60 can be supported in an area where the main components of the reduction unit 10 are not concentrated. That is, if the second shaft 60 extends from the second gear 64 in the −Z direction, it is easy to maintain the space for disposing the angular contact ball bearing 56 and the second sleeve 54.

Further, the second bevel gear 42 is affixed to the second gear 64 farther towards the +Z direction side than the second gear 64. In other words, the second bevel gear 42 is affixed to the second gear 64 on the opposite side, relative to the second gear 64, from the angular contact ball bearings 56. Further, the angular contact ball bearing 56 supports the second shaft 60. Since the second bevel gear 42 is not disposed between the second gear 64 and the angular contact ball bearing 56, the distance between the second gear 64 and the angular contact ball bearing 56 can be shortened. The length of the second shaft 60 in the direction of the axis 58 can be made shorter than in the configuration in which the second bevel gear 42 is disposed between the second gear 64 and the second shaft 60. Consequently, the length of the gear transmission 100 in the direction of the axis 78 can be further shortened.

The first shaft 50 supporting the first bevel gear 44 is rotatably supported in the first sleeve 48. Furthermore, the second shaft 60 supporting the second bevel gear 42 is rotatably supported in the second sleeve 54. That is, the first bevel gear 44 and the second bevel gear 42 are made into respective units. The meshing of the first bevel gear 44 and the second bevel gear 42 can be easily adjusted. Consequently, it is possible to prevent the meshing state of the first bevel gear 44 and the second bevel gear 42 from adversely affecting the meshing state of the second gear 64 and the outer-toothed ring gear 66.

A through-hole is formed in a central portion of each of the carrier 2, the external gears 24 and the two-stage gear 72. A cylindrical member 4 passes through the through-holes. Wiring, piping, etc. can be disposed within the cylindrical member 4. An oil seal 6 is disposed between the carrier upper portion 2a and the cylindrical member 4. An O-ring 76 is disposed between the pedestal 95 and the cylindrical member 4. An oil seal 20 is disposed between the case 90 and the carrier upper portion 2a. An oil seal 52 is disposed between the first sleeve 48 and the first shaft 50. Further, a cap 62 covers an end of the second shaft 60 and is affixed to the second sleeve 54. The oil seals 6, 20 and 52, the O-ring 76 and the cap 62 prevent lubricant (oil or grease) within the gear transmission 100 from leaking to the exterior of the gear transmission 100.

Technical features of the gear transmission of the embodiment will briefly be noted below. In the gear transmission of the embodiment, the external gears eccentrically rotate. The techniques taught in the present specification can also be applied to a gear transmission in which the internal gear eccentrically rotates. The eccentric oscillating-type gear transmission comprises the internal gear, the external gears, the crankshaft and the carrier. The internal gear is formed inside the case of the gear transmission. The carrier is disposed coaxially with the internal gear. The carrier is rotatably supported on the case. The axis of the carrier (the axis of the internal gear) corresponds to the axis of the gear transmission. The carrier further supports the external gears and the crankshaft. The external gears are supported on the carrier in a state allowing eccentric rotation of the external gears. The external gears and the carrier rotate relative to the internal gear, while the external gears eccentrically rotate about the axis of the carrier. The through-hole is formed in the external gears.

The crankshaft extends alongside the axis of the gear transmission at a position offset in the radial direction from the axis of the gear transmission (the axis of the carrier). The crankshaft is rotatably supported on the carrier. The eccentric bodies are formed on the crankshaft. The eccentric bodies engage with the through-holes of the external gears. The first gear is affixed to the end of the crankshaft. Torque from the motor is transmitted to the first gear. When the crankshaft rotates, the external gear rotates eccentrically while meshing with the internal gear. Since the external gear rotates relative to the internal gear, the carrier rotates relative to the internal gear.

The gear transmission comprises the second gear and the two-stage gear. The two-stage gear comprises the center gear and the outer-toothed ring gear. The two-stage gear is disposed coaxially with the axis of the gear transmission. The outer-toothed ring gear is affixed to the hub of the center gear. The recess is formed in the circumferential direction in the two-stage gear between the outer-toothed ring gear and the center gear. The first gear is disposed in the recess.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A gear transmission having an internal gear and an external gear meshing with each other, one of the internal gear and the external gear being eccentrically rotatable relative to the other, the gear transmission comprising:
    a crankshaft having an end fixed to a first gear, the crankshaft being configured to eccentrically rotate one of the internal gear and the external gear;
    a two-stage gear having a center gear, which meshes with the first gear, and an outer-toothed ring gear, which is disposed coaxially with the center gear and surrounds the first gear; and
    a second gear meshing with the outer-toothed ring gear, the second gear being configured to transmit torque from a motor to the two-stage gear;
    wherein the two-stage gear is configured such that a range where an outer teeth portion of the center gear is formed and a range where an outer teeth portion of the outer-toothed ring gear is formed are each at least partially disposed in a common plane that is perpendicular to a rotational axis of the gear transmission.

2. The gear transmission according to claim 1, wherein the first gear and the second gear are also each at least partially disposed in the common plane.

3. The gear transmission according to claim 2, wherein an annular recess is formed between the center gear and the outer-toothed ring gear.

4. The gear transmission according to claim 3, wherein
    the crankshaft extends from the first gear in a first direction,
    a shaft supporting the second gear extends in a second direction that is opposite to the first direction, and
    a bevel gear is fixed to a side of the second gear that faces the first direction.

5. The gear transmission according to claim 4, wherein the outer-toothed ring gear is affixed to a hub of the center gear.

6. The gear transmission according to claim 5, wherein the two-stage gear has a rotational axis that is coaxial with the rotational axis of the gear transmission.

7. The gear transmission according to claim 6, wherein a radially-outer portion of the outer-toothed ring gear has a first thickness in the direction of the rotational axis, a radially-inner portion of the outer-toothed ring gear has a second thickness in the direction of the rotational axis and the first thickness is greater than the second thickness.

8. The gear transmission according to claim 7, wherein the first gear is disposed in the annular recess of the outer-toothed ring gear.

9. The gear transmission according to claim 8, wherein the first gear is completely surrounded by the outer-toothed ring gear in a direction that is perpendicular to the rotational axis.

10. The gear transmission according to claim 1, wherein an annular recess is formed between the center gear and the outer teeth of the outer-toothed ring gear, and wherein the first gear is disposed in the annular recess.

11. The gear transmission according to claim 10, wherein the first gear is completely surrounded by the outer-toothed ring gear in a direction that is perpendicular to the rotational axis.

12. The gear transmission according to claim 1, wherein
    the crankshaft extends from the first gear in a first direction,
    a shaft supports the second gear and extends from the second gear in a second direction that is opposite to the first direction, and
    a bevel gear is affixed to a side of the second gear that faces the first direction, the bevel gear being coupleable to a rotational output of the motor.

13. The gear transmission according to claim 1, wherein the outer-toothed ring gear is affixed to a hub of the center gear.

14. The gear transmission according to claim 1, wherein the two-stage gear has a rotational axis that is coaxial with the rotational axis of the gear transmission.

15. The gear transmission according to claim 1, wherein a radially-outer portion of the outer-toothed ring gear has a first thickness in the direction of the rotational axis, a radially-inner portion of the outer-toothed ring gear has a second thickness in the direction of the rotational axis and the first thickness is greater than the second thickness.

16. A gear transmission having a rotational axis, comprising:
    an internal gear meshing with an external gear, one of the internal gear and the external gear being eccentrically rotatable relative to the other,
    a crankshaft configured to eccentrically rotate one of the internal gear and the external gear,
    a first gear connected to an end of the crankshaft,
    a center gear meshing with the first gear,
    an outer-toothed ring gear disposed coaxially with the center gear and at least partially surrounding the first gear in a plane that intersects the rotational axis of the gear transmission, and
    a second gear meshing with external teeth of the outer-toothed ring gear and being configured to transmit torque from an external power source to the outer-toothed ring gear and the center gear;
    wherein a range where an outer teeth portion of the center gear is formed and a range where an outer teeth portion of the outer-toothed ring gear is formed are each at least partially disposed in a common plane that is perpendicular to a rotational axis of the gear transmission.

17. The gear transmission according to claim 16, wherein:
    the first gear and the second gear are also each at least partially disposed in said plane,
    the outer-toothed ring gear is affixed to a hub of the center gear and the outer-toothed ring gear and the center gear have a common rotational axis that is coaxial with the rotational axis of the gear transmission.

18. The gear transmission according to claim 17, wherein:
a radially-outer portion of the outer-toothed ring gear has a first thickness in the direction of the rotational axis,
a radially-inner portion of the outer-toothed ring gear has a second thickness in the direction of the rotational axis,
the first thickness is greater than the second thickness such that an annular recess is defined between the hub of the center gear and the radially-outer portion of the outer-toothed ring gear,
the first gear is at least substantially disposed in the annular recess and
the first gear is completely surrounded by the radially-outer portion of the outer-toothed ring gear in a direction that is perpendicular to the rotational axis.

19. The gear transmission according to claim 18, wherein the crankshaft extends from the first gear in a first direction parallel to the rotational axis,
a shaft supports the second gear and extends from the second gear in a second direction that is opposite to the first direction, and
a bevel gear is affixed to a side of the second gear that faces the first direction, the bevel gear being coupleable to the external power source.

20. The gear transmission according to claim 1, wherein an annular channel is defined by the center gear and the outer-toothed ring gear, a bottom and first side of the annular channel being formed by the outer-toothed ring gear and a second side of the annular channel being formed by the center gear, and wherein a toothed portion of the first gear is at least partially disposed in the annular channel.

* * * * *